H. E. KINNEY.
HARROW.
APPLICATION FILED APR. 5, 1909.

982,607.

Patented Jan. 24, 1911.

Witnesses
C. K. Reichenbach
L. A. Rice

Inventor
Henry E. Kinney,
By E. W. Bradford
Attorney

UNITED STATES PATENT OFFICE.

HENRY EDWARD KINNEY, OF DOXEY, OKLAHOMA.

HARROW.

982,607.   Specification of Letters Patent.   Patented Jan. 24, 1911.

Application filed April 5, 1909. Serial No. 488,131.

*To all whom it may concern:*

Be it known that I, HENRY EDWARD KINNEY, a citizen of the United States, residing at Doxey, in the county of Beckham and State of Oklahoma, have invented certain new and useful Improvements in Harrows, of which the following is a specification.

My said invention consists in various improvements in the details of construction of that class of harrows or cultivators which are designed especially for use in loosening up the surface of the earth in listed furrows, either before or after the planting of the crop, for the purpose of preparing the soil for more advantageous propagation of the seed and the destruction of weeds, etc., all as will be hereinafter more fully described and claimed.

Figure 1:
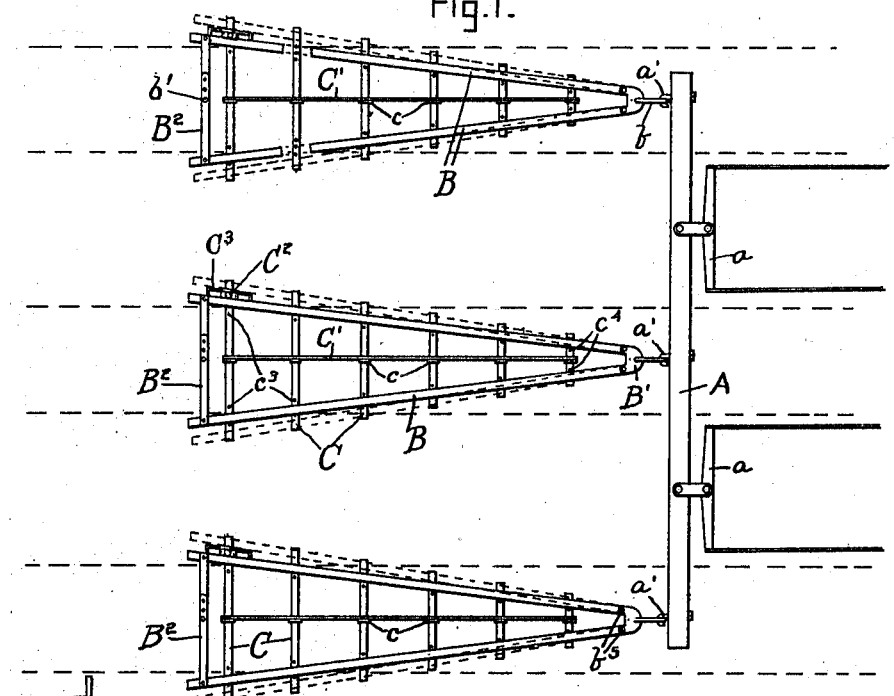
Figure 2:
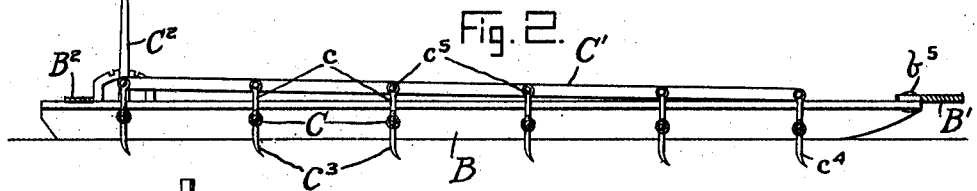
Figure 4:
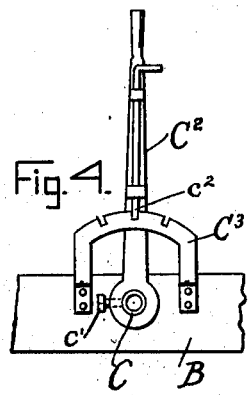
Figure 3:
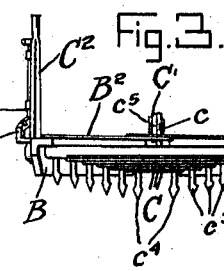
Figure 5:
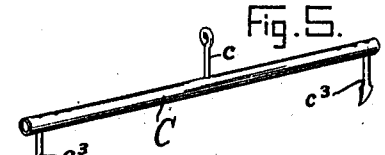

Referring to the accompanying drawings which are made a part hereof and on which similar reference characters indicate similar parts, Figure 1 is a plan view of a harrow embodying my said invention, as when in operation, Fig. 2 a central longitudinal section through one of the harrow sections, Fig. 3 a rear elevation, Fig. 4 a detail side elevation of the rear end of one side-bar showing the adjusting lever and connections, and Fig. 5 a detail perspective view of one of the tooth-bars.

In said drawings the portions marked A represent the frame or bar to which the several harrow sections are attached, B the side bars of the frame of each harrow section, and C the tooth carrying bars.

The bar A has the whiffletrees $a$ attached to its front side by which the team may be attached for drawing the harrow, or it may be provided with means for attachment to any other draft medium. On its rear side it is provided with a series of hooks $a'$ arranged a distance apart suitable for attaching the harrow sections thereto. I have shown three harrow sections attached to bar A, but this number may be more or less as desired for the particular work to be done. Each harrow section is composed of the side bars B hinged at their forward ends on hinge-bolts $b^5$ to a suitable head-piece B' which is connected by a connecting link $b$ with one of the hooks $a'$ on the bar A. Said bars extend rearwardly at an angle to each other each harrow section being fan-shaped, the rear ends of bars B being held the desired distance apart by means of brace-bars $B^2$, each of which is formed of two sections with overlapping ends secured together at the center by bolts $b'$ extending through perforations in said overlapping ends. Said ends are provided with a series of perforations, as shown. By this means the rear end of each section may be adjusted to the width desired by removing said bolts $b'$ and inserting them through the perforations which will make said bar $B^2$ the desired length.

The several tooth carrying bars C are mounted at their ends in perforations in the side pieces B and are adapted to rock therein. An upwardly extending arm $c$ is provided in the center of each of said bars the upper end of which is connected by a pivot $c^5$ to a longitudinal connecting bar C'. A lever $C^2$ is rigidly secured to one end of the rear tooth bar by a set screw $c'$ and has a pawl $c^2$ adapted to engage with notches in the upper edge of a segment $C^3$ secured to one of the side bars B. By this means the angle of the teeth $c^3$ may be adjusted as desired. Said segment $C^3$ is formed off-set to extend slightly beyond the outside face of the side bar and lever $C^2$ is mounted and works between said segment and said bar, as in a way. By the loosening of said screw $c'$ said lever will slide longitudinally on the tooth-bar C as the harrow section is adjusted in width. Each tooth-bar is formed with a series of sockets or perforations to receive the shanks of the teeth $c^3$ which are mounted therein near their ends just inside of the bars B, and each tooth-bar is provided with but one tooth at each end. When it is desired to adjust the width of the harrow sections the teeth are removed from the sockets and inserted in other sockets which will secure the desired width of the harrow. The brace-bar $B^2$ is lengthened or shortened, as before described, the lever $C^2$ adjusted and re-secured on the tooth-bar and the harrow is again ready for operation. By this arrangement the several sections can be readily changed to accommodate the width of the furrow desired which varies, as is well known, from 12 to 16 inches, more or less, according to the width of the lister used in making the furrow. The furrows being 6 to 8 inches deep each harrow section will follow in a furrow without requiring any means for holding it therein. The adjustment of the angle of the teeth through the operation of the lever $C^2$, and its connection with bar C' with the several tooth-bars C through the arms $c$, enables any angle to be readily secured which will be most advantageous in the particular character of work being done and on the soil operated upon. When the plants are up and it is desired to use the harrow for breaking up the surface after a rain, or destroy the weeds, to accelerate and nourish the growth of the plants, the teeth may be removed from the front bar C so that none of the teeth of the harrow will contact with or injure the plants. As will be seen by noticing Fig. 3, the teeth are arranged one at the ends of each of the bars C to form a complete line across the width of the harrow equi-distant apart. It will also be noticed that by removing the front teeth, marked $c^4$ for purposes of distinction, from the front bar a space of sufficient width will be left free to safely clear the growing plants.

Having thus fully described my said invention, what I claim as new, and desire to secure by Letters Patent, is:

1. A harrow for use in listed furrows comprising a series of harrow sections each adapted to follow in a furrow and connected to a draft frame, each of said sections being V-shaped with sides pivoted at their front ends to a head piece and their rear ends transversely adjustable, rocking tooth-bars mounted in said sides each of which has a series of sockets near each end, a harrow tooth mounted near each end of each bar adapted to be secured in one or another socket to correspond to the expansion of the frame, whereby from front to rear the teeth may be arranged to follow a distance to one side of the teeth of the adjacent bar, a connecting rod connected to a projecting arm on each of said several tooth-bars, a lever connected with one of said tooth-bars for operating the same, and means for securing said lever in the desired adjustment, substantially as set forth.

2. A harrow for use in listed land comprising V-shaped sections composed of sides hinged at their front ends and adjustably secured at their rear ends, cross tooth-bars carried by said sides, and a single tooth adjustably mounted near each end of each tooth-bar, whereby from front to rear the teeth are arranged to follow a distance to one side of the teeth of each adjacent bar and the removal of the teeth from the front bar will leave an open space in the harrow, substantially as set forth.

3. A harrow for use in listed furrows comprising several harrow sections connected to a draft bar, each section comprising a head, side bars pivoted to said head and extending back at an angle away from each other, a brace between said side bars, a series of tooth-bars of varying lengths arranged at intervals from the narrow front end to the wide rear end of each section, each tooth-bar being provided with a series of tooth-holding sockets near each end, and a single tooth mounted in one of said sockets at each end of each bar, substantially as set forth.

4. A harrow for use in listed furrows comprising several V-shaped harrow sections connected to a draft bar each of said sections comprising a head, pivoted side bars connected to said head, an adjustable brace-bar between the rear ends of said side bars, rocking tooth-bars in said side bars each provided with a projecting arm, a longitudinal bar connected to each of said arms, teeth in said tooth-bars, and a lever mounted on the outer end of one of said tooth-bars between a notched segment and the side bar, said segment, a pawl on said lever for engaging said notched segment, and means for adjusting said lever longitudinally on said bar as said side-bars are adjusted, substantially as set forth.

In witness whereof, I have hereunto set my hand and seal at Doxey, Oklahoma, this 1st day of April, A. D. nineteen hundred and nine.

HENRY EDWARD KINNEY. [L. S.]

Witnesses:
D. N. HUNT,
H. C. FORD.